(12) United States Patent
Chen

(10) Patent No.: US 7,450,306 B2
(45) Date of Patent: Nov. 11, 2008

(54) OPTICAL FILTER FOR BLOCKING UV LIGHT AND IR LIGHT

(75) Inventor: Ga-Lane Chen, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 218 days.

(21) Appl. No.: 11/307,589

(22) Filed: Feb. 14, 2006

(65) Prior Publication Data

US 2006/0198025 A1     Sep. 7, 2006

(30) Foreign Application Priority Data

Mar. 4, 2005   (CN) .................... 2005 1 0033491

(51) Int. Cl.
*G02B 1/10* (2006.01)
(52) U.S. Cl. ................ 359/588; 359/589; 359/590; 359/359
(58) Field of Classification Search .............. None
See application file for complete search history.

(56) References Cited

U.S. PATENT DOCUMENTS

| | | | | |
|---|---|---|---|---|
| 5,138,219 A | * | 8/1992 | Krisl et al. ........... | 313/112 |
| 5,179,468 A | * | 1/1993 | Gasloli ............... | 359/359 |
| 5,274,661 A | * | 12/1993 | von Gunten et al. ..... | 372/99 |
| 5,615,289 A | * | 3/1997 | Duck et al. ........... | 385/24 |
| 5,719,989 A | | 2/1998 | Cushing | |
| 5,982,078 A | * | 11/1999 | Krisl et al. ........... | 313/112 |
| 6,391,400 B1 | * | 5/2002 | Russell et al. ......... | 428/34 |
| 6,611,378 B1 | * | 8/2003 | Wang et al. ........... | 359/588 |
| 7,276,685 B2 | * | 10/2007 | Chen ................. | 250/216 |
| 7,333,266 B2 | * | 2/2008 | Shang ................ | 359/584 |
| 2006/0012882 A1 | * | 1/2006 | Shang ................ | 359/586 |
| 2006/0018022 A1 | * | 1/2006 | Shang ................ | 359/589 |
| 2007/0002432 A1 | * | 1/2007 | Chen et al. ........... | 359/359 |
| 2007/0002433 A1 | * | 1/2007 | Chen et al. ........... | 359/359 |

FOREIGN PATENT DOCUMENTS

CN          1031605 A       3/1989

\* cited by examiner

*Primary Examiner*—Arnel C Lavarias
(74) *Attorney, Agent, or Firm*—Winston Hsu

(57) ABSTRACT

An exemplary optical filter includes a substrate, a plurality of contiguous identical lower filter cavities formed on the substrate, and a plurality of contiguous upper filter cavities formed on the lower filter cavities. Each of the lower filter cavities includes two high refractive index layers and one low refractive index layer sandwiched between the high refractive index layers. Each of the upper filter cavities includes two low refractive index layers and one high refractive index layer sandwiched between the low refractive index layers. The plurality of upper filter cavities includes a first filter cavity, a plurality of second filter cavities, a third filter cavity, and a plurality of fourth filter cavities.

5 Claims, 5 Drawing Sheets

OPTICAL FILTER FOR BLOCKING UV LIGHT AND IR LIGHT

FIELD OF THE INVENTION

The invention relates generally to an optical filter, more particularly, to an optical filter which is capable of shielding/blocking light in infrared (IR) and ultra violet (UV) wavebands and has high transmittance at the visible light waveband.

DESCRIPTION OF RELATED ART

Optical filters are designed to transmit a specific waveband or reduce a spectral range (bandpass, cut off, and interference filter). They are composed of many thin layers of dielectric materials, which have differing refractive indices to produce constructive and destructive interference in the transmitted light. In this way, optical filters can be used to transmit a specific waveband and cut off undesired wavelength range. For example, optical filters capable of shielding UV and IR wavebands are used as car's windows for reducing temperature inside the car. The range limitations are usually dependant upon the interference filters lens, and the composition of the thin film filter material.

Optical filters designed to transmit near infrared wavelengths are tuned to the 750 nm to 2500 nm wavelength range; visible, for use in the 380 nm to 750 nm wavelength range; and ultra violet, for use in the 4 nm to 380 nm wavelength range. In optical filters, wavelength selection is often based on the property of destructive light interference, which is the same principle underlying the operation of a Fabry-Perot interferometer as FIG. 4. In FIG. 4, incident light passes through two coated reflecting layers 1. A spacer 2 between the reflective layers 1 determines which wavelengths will destructively interfere and which wavelengths will be allowed to pass through the reflecting layers 1. In situations where the reflected beams are in phase, the light will pass through the two reflective layers 1. However, if the wavelengths are out of phase, destructive interference will block most of the reflections, allowing almost nothing to transmit through. In this way, interference filters are able to attenuate the intensity of transmitted light at wavelengths that are higher or lower than desired.

Referring to FIG. 5, a typical optical bandpass filter 10 is shown. The optical filter 10 is comprised of alternating layers of two (or more) transparent dielectric films with dissimilar indices of refraction. A cavity 10a comprises alternating quarter wave thick layers of high and low refractive index materials. For the simplest case, a layer structure of the cavity 10a is represented as HLLH, i.e. a high index layer is followed by two low index layers and one high index layer. Next, a low index layer 12 is disposed between the cavities 10a and 10b that follows. The next core cavity 10b is of the layer structure HLH LL HLH in the simplest case. Hence, the core cavity 10b is considered to be a seven layer structure, having a half wave layer LL disposed between two HLH, quarter wave layers stacks.

The core cavity 10b may be repeated many times to produce a filter having sharp slopes. The first cavity 10a is then repeated; and, finally another matching layer to the next medium is added as necessary. The substrate 6 is transparent The dielectric materials for this application generally have indices of refraction in the range from 1.3 to 4.0.

However, the conventional optical filters have the following disadvantages. The optical filters cannot almost shield infrared (IR) light radiated from the panel assembly, an IR shield (not shown) must be interposed between the electromagnetic wave shield and the panel assembly. Also, the optical filters reduce visible light transmittance and in turn contrast characteristic. Poor luminance characteristic of blue phosphor, relative to that of red and green phosphors, increases a need for color correction in the blue visible wavelength range.

What is needed, therefore, is an optical filter that is capable of shielding UV and IR wavebands and has high visible light transmittance.

SUMMARY OF INVENTION

The present invention provides an optical filter. In one embodiment, the optical filter includes a substrate, a number of contiguous identical lower filter cavities formed on the substrate and a number of contiguous upper filter cavities formed on the lower filter cavities.

Each of the lower filter cavities consists of two high refractive index layers and one low refractive index layer sandwiched between the high refractive index layers. Each high refractive index layer of the lower filter cavities has a thickness equal to 0.5 times one eighth of a central wavelength associated therewith. Each low refractive index layer of the lower filter cavities has a thickness equal to 0.5 times one fourth of a central wavelength associated therewith.

Each of the upper filter cavities consists of two low refractive index layers and one high refractive index layer sandwiched between the low refractive index layers. The upper filter cavities include a first filter cavity having a high refractive index layer thereof having a thickness equal to 1.666 times one fourth of a central wavelength associated therewith, and low refractive index layers thereof each having a thickness equal to 1.666 times one eighth of a central wavelength associated therewith; second filter cavities each having a high refractive index layer thereof having a thickness equal to 1.4 times one fourth of a central wavelength associated therewith, and low refractive index layers thereof each having a thickness equal to 1.4 times one eighth of a central wavelength associated therewith; a third filter cavity having a high refractive index layer thereof having a thickness equal to 1.6 times one fourth of a central wavelength associated therewith, and low refractive index layers thereof each having a thickness equal to 1.6 times one eighth of a central wavelength associated therewith; and fourth filter cavities each having a high refractive index layer thereof having a thickness equal to 1.8 times one fourth of a central wavelength associated therewith, and low refractive index layers thereof each having a thickness equal to 1.8 times one eighth of a central wavelength associated therewith.

The material of the high refractive index layer is selected from one of tantalum pentoxide ($Ta_2O_5$) and titanium dioxide ($TiO_2$). The material of the low refractive index layer is selected from one of silicon dioxide ($SiO_2$) and alumina ($Al_2O_3$).

Advantages and novel features of the present optical filter will become more apparent from the following detailed description of preferred embodiments when taken in conjunction with the accompanying drawings.

BRIEF DESCRIPTION OF DRAWINGS

Many aspects of the present optical filter can be better understood with reference to the following drawings. The components in the drawings are not necessarily to scale, the emphasis instead being placed upon clearly illustrating the principles of the present optical filter.

Figure 1:
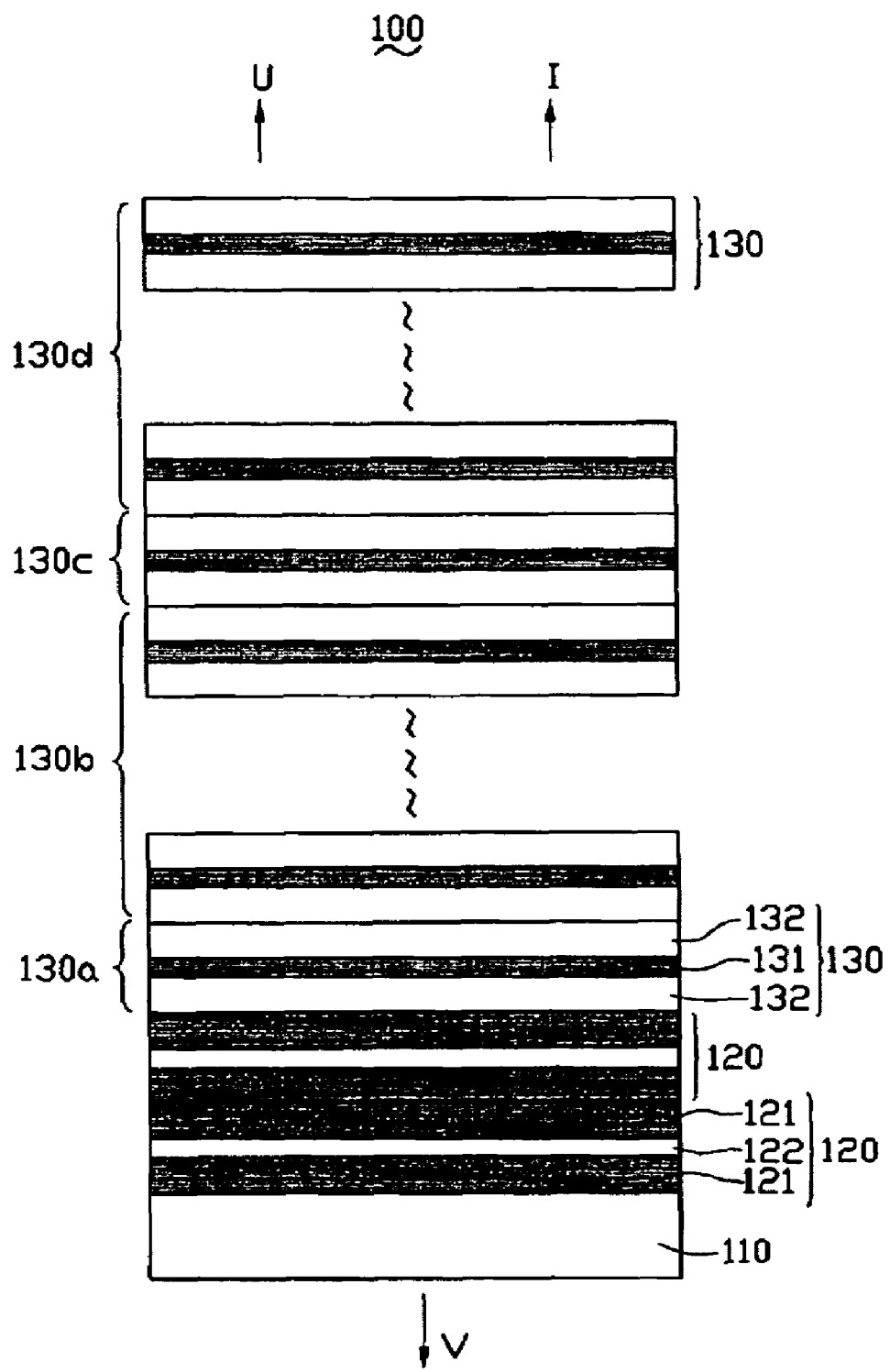
FIG. 1 is a schematic, cross sectional view showing an optical filter in accordance with a preferred embodiment.

Corresponding reference characters indicate corresponding parts throughout the several views. The exemplifications set out herein illustrate at least one preferred embodiment of the present invention, in one form, and such exemplifications are not to be construed as limiting the scope of the invention in any manner.

DETAILED DESCRIPTION

Reference will now be made to the drawings to describe embodiments of the present invention, in detail.

Referring to FIG. 1, an optical filter 100 according to a preferred embodiment is shown. The optical filter 100 includes a substrate 110, two contiguous identical lower filter cavities 120 formed on the substrate 110 and a number of contiguous upper filter cavities 130 formed on the lower filter cavities 120. Each of the lower filter cavities 120 consists of two high refractive index layers 121 and one low refractive index layer 122 sandwiched between the high refractive index layers 121. Each high refractive index layer 121 of the lower filter cavities has a thickness equal to 0.5 times one eighth of a central wavelength associated with the optical filter 100. Each low refractive index layer 122 of the lower filter cavities has a thickness equal to 0.5 times one fourth of a central wavelength associated therewith.

Each of the upper filter cavities 130 consists of two low refractive index layers 132 and one high refractive index layer 131 sandwiched between the low refractive index layers 132. Each of the upper filter cavities 130 has a different thickness. According to the thickness, the upper filter cavities can be classified into four groups 130a, 130b, 130c and 130d. The first filter cavity 130a has a high refractive index layer thereof having a thickness equal to 1.666 times one fourth of a central wavelength associated with the optical filter 100, and low refractive index layers thereof each having a thickness equal to 1.666 times one eighth of a central wavelength associated therewith. The second filter cavities 130b have six upper filter cavities 130, each having a high refractive index layer thereof having a thickness equal to 1.4 times one fourth of a central wavelength associated with the optical filter 100, and low refractive index layers thereof each having a thickness equal to 1.4 times one eighth of a central wavelength associated therewith. The third filter cavity 130c has a high refractive index layer thereof having a thickness equal to 1.6 times one fourth of a central wavelength associated with the optical filter 100, and low refractive index layers thereof each having a thickness equal to 1.6 times one eighth of a central wavelength associated therewith. The fourth filter cavities 130d have eight upper filter cavities 130 each having a high refractive index layer thereof having a thickness equal to 1.8 times one fourth of a central wavelength associated with the optical filter 100, and low refractive index layers thereof each having a thickness equal to 1.8 times one eighth of a central wavelength associated therewith.

The layer structure of the optical filter 100 can be represented as HLH HLH LHL LHL…LHL. H symbolizes a high refractive index layer and L symbolizes a low refractive index layer. If considering the adjacent similar layers (i.e. HH and LL) as one layer, the optical filter 100 has thirty-eight refractive index layers. A detail list of all layers is as below: (layer 1 is on the substrate 110 and other layers are formed one on another)

| Layer | Material | Thickness(nm) |
|---|---|---|
| 1 | Ta2O5 | 28.2 |
| 2 | SiO2 | 89.3 |
| 3 | Ta2O5 | 56.3 |
| 4 | SiO2 | 89.3 |
| 5 | Ta2O5 | 28.2 |
| 6 | SiO2 | 148.8 |
| 7 | Ta2O5 | 187.7 |
| 8 | SiO2 | 273.8 |
| 9 | Ta2O5 | 157.7 |
| 10 | SiO2 | 250.0 |
| 11 | Ta2O5 | 157.7 |
| 12 | SiO2 | 250.0 |
| 13 | Ta2O5 | 157.7 |
| 14 | SiO2 | 250.0 |
| 15 | Ta2O5 | 157.7 |
| 16 | SiO2 | 250.0 |
| 17 | Ta2O5 | 157.7 |
| 18 | SiO2 | 250.0 |
| 19 | Ta2O5 | 157.7 |
| 20 | SiO2 | 268.4 |
| 21 | Ta2O5 | 181.4 |
| 22 | SiO2 | 304.5 |
| 23 | Ta2O5 | 202.8 |
| 24 | SiO2 | 321.4 |
| 25 | Ta2O5 | 202.8 |
| 26 | SiO2 | 321.4 |
| 27 | Ta2O5 | 202.8 |
| 28 | SiO2 | 321.4 |
| 29 | Ta2O5 | 202.8 |
| 30 | SiO2 | 321.4 |
| 31 | Ta2O5 | 202.8 |
| 32 | SiO2 | 321.4 |
| 33 | Ta2O5 | 202.8 |
| 34 | SiO2 | 321.4 |
| 35 | Ta2O5 | 202.8 |
| 36 | SiO2 | 321.4 |
| 37 | Ta2O5 | 202.8 |
| 38 | SiO2 | 160.7 |

Materials of the high refractive index layers 121 and 131 are selected from one of tantalum pentoxide ($Ta_2O_5$) and titanium dioxide ($TiO_2$). Materials of the low refractive index layers 122 and 132 are selected from one of silicon dioxide ($SiO_2$) and alumina ($Al_2O_3$). For disinfecting and self-cleaning advantage, the materials of the high refractive index layers 121 and 131 can be selected from one of nano tantalum pentoxide ($Ta_2O_5$) and nano titanium dioxide ($TiO_2$). The materials of the low refractive index layers 122 and 132 can be selected from one of nano silicon oxide ($SiO_2$) and nano alumina ($Al_2O_3$).

Figure 2:
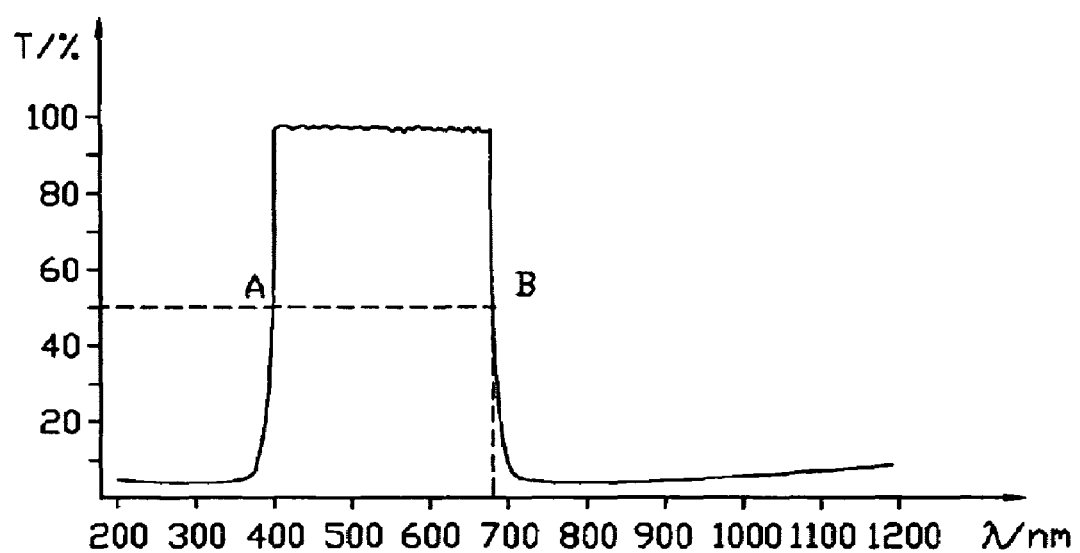
FIG. 2 is a graph showing a transmittance spectrum of the optical filter of FIG. 1.

Referring to FIG. 2, a transmittance spectrum of an optical filter of the present invention is shown. The bandpass waveband of the optical filter is between about 400 nm to about 700 nm. A cut off wavelength A of short waveband is in a range from 400 nm to 420 nm (e.g., 410+10 nm); and a cut off wavelength B of long waveband is in a range from 660 nm to 700 nm (e.g., 680+20nm). The optical filter can reflect ultra violet UV radiation in a wavelength range from 200 nm to 400 nm, and infrared (IR) radiation in a wavelength range from 700 nm to 1200 nm. Also referring to FIG. 1, arrows I and U represent the IR and UV ray being reflected by the optical filter 200, and an arrow V represents visible light pass through the optical filter 200. Transmittances of the optical filter for IR and UV are both less than 2% and the lowest is 1% at the best condition. Transmittance for visible light is about 98%. The spectrum has an essentially square shape with little ripple and sharp slope between the cut off wavelengths A and B. This situation means the optical filter of the present invention has good bandpass performance for shielding IR and UV waveband radiation, and letting visible light pass through.

Figure 3:
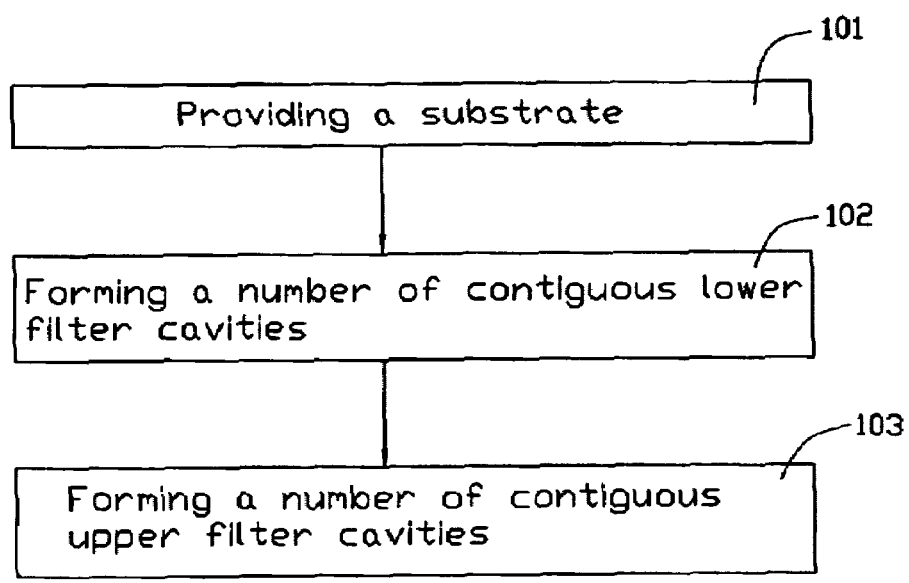
FIG. 3 is a flowchart of a method for manufacturing the optical filter of FIG. 1.
Figure 4:
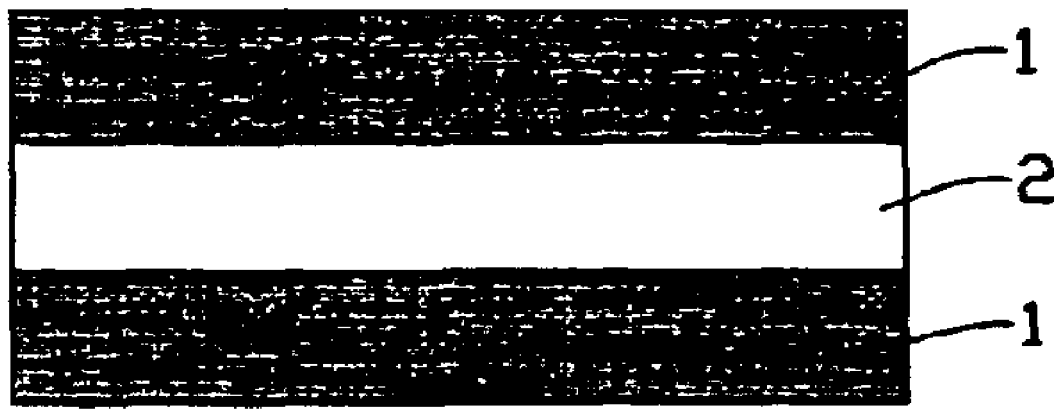
FIG. 4 is a schematic, cross sectional view showing a basic structure of a Fabry-Perot interferometer.
Figure 5:
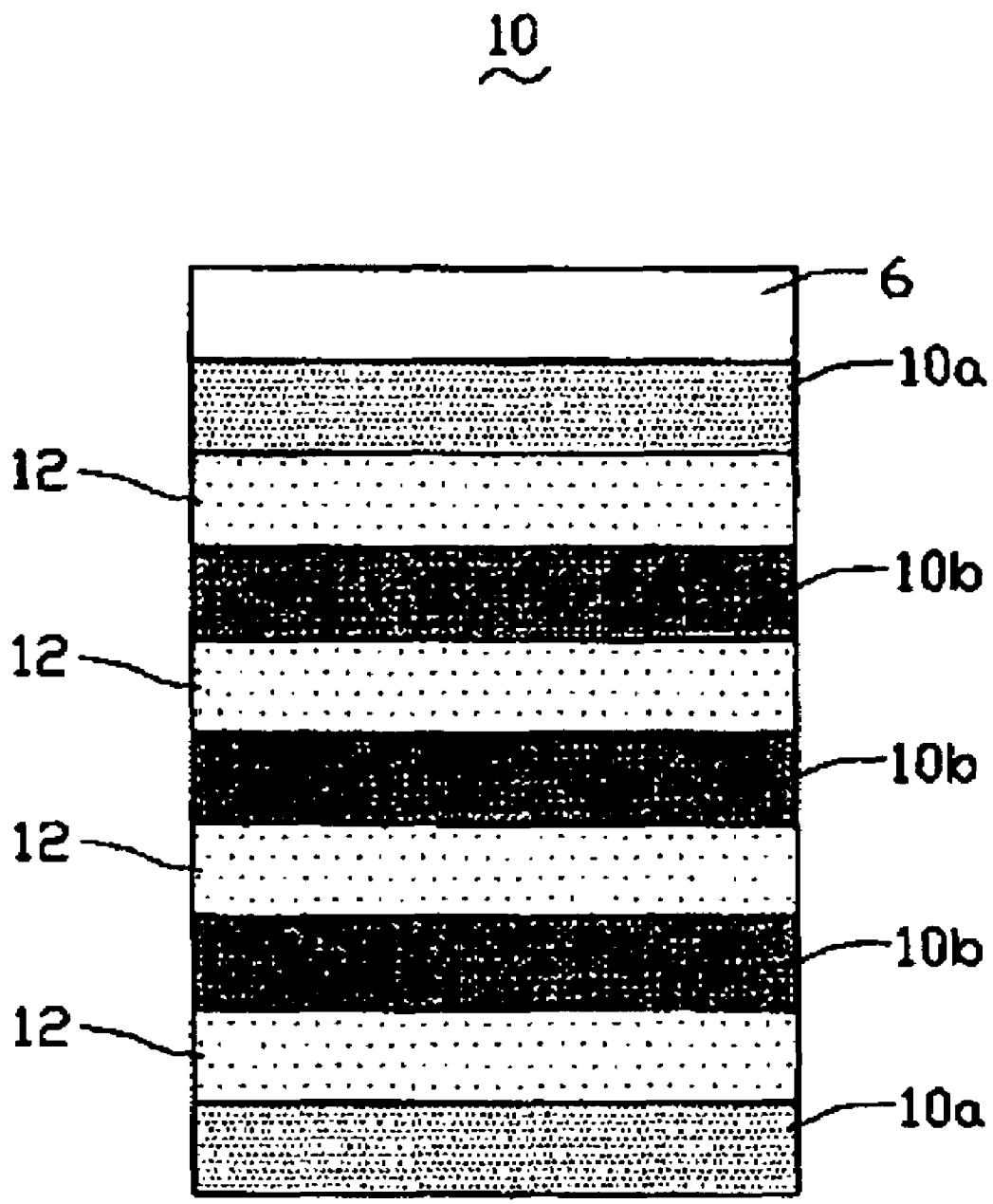
FIG. 5 is a schematic, cross sectional view showing a conventional optical filter.

Referring to FIG. 3, a method for making the above-described optical filter includes steps of: step 101: providing a substrate; step 102: forming a number of contiguous lower filter cavities on the substrate; step 103: forming a number of contiguous upper filter cavities on the lower filter cavities.

In the step 101, the substrate is transparent, such as glass substrate. In the step 102, the lower filter cavities are formed on the substrate by an electron beam deposition method. Each of the lower filter cavities consists of two high refractive index layers and one low refractive index layer sandwiched between the high refractive index layers. Each high refractive index layer of the lower filter cavities has a thickness equal to 0.5 times one eighth of a central wavelength associated therewith. Each low refractive index layer of the lower filter cavities has a thickness equal to 0.5 times one fourth of a central wavelength associated therewith.

In the step 103, the upper filter cavities are formed on the lower filter cavities by an electron beam deposition method. Each of the upper filter cavities consists of two low refractive index layers and one high refractive index layer sandwiched between the low refractive index layers. The upper filter cavities include a first filter cavity having a high refractive index layer thereof having a thickness equal to 1.666 times one fourth of a central wavelength associated therewith, and low refractive index layers thereof each having a thickness equal to 1.666 times one eighth of a central wavelength associated therewith; second filter cavities each having a high refractive index layer thereof having a thickness equal to 1.4 times one fourth of a central wavelength associated therewith, and low refractive index layers thereof each having a thickness equal to 1.4 times one eighth of a central wavelength associated therewith; a third filter cavity having a high refractive index layer thereof having a thickness equal to 1.6 times one fourth of a central wavelength associated therewith, and low refractive index layers thereof each having a thickness equal to 1.6 times one eighth of a central wavelength associated therewith; and fourth filter cavities each having a high refractive index layer thereof having a thickness equal to 1.8 times one fourth of a central wavelength associated therewith, and low refractive index layers thereof each having a thickness equal to 1.8 times one eighth of a central wavelength associated therewith.

The material of the high refractive index layer is selected from one of tantalum pentoxide ($Ta_2O_5$) and titanium dioxide ($TiO_2$). The material of the low refractive index layer is selected from one of silicon dioxide ($SiO_2$) and alumina ($Al_2O_3$). For disinfecting and self-cleaning advantage, the material of the high refractive index layer can be selected from one of nano tantalum pentoxide ($Ta_2O_5$) and nano titanium dioxide ($TiO_2$). The material of the low refractive index layer can be selected from one of nano silicon oxide ($SiO_2$) and nano alumina ($Al_2O_3$).

Compared with conventional optical filters, the present optical filter uses multi layers to cut off IR and UV radiation, and calculates optimal thicknesses for each layer. Transmittances of the optical filter for IR and UV are all below 2% and the lowest is 1% at the best condition. Transmittance for visible light is about 98%. The transmittance spectrum has an essentially square shape with little ripple and sharp slope. It means the optical filter has a good performance for cutting off IR and UV wavebands and having high transmittance at the visible light waveband. The present optical filter has many applications. For example, the present optical filter can be used on a car's windows for UV and IR shielding. It can reduce indoor temperature of the car and protect eyes and skins of drivers and passengers.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An optical filter comprising:
    a substrate;
    a plurality of contiguous identical lower filter cavities formed on the substrate, each of the lower filter cavities consisting of two high refractive index layers and one low refractive index layer sandwiched between the high refractive index layers, wherein each high refractive index layer of the lower filter cavities has a thickness equal to 0.5 times one eighth of a central wavelength associated therewith, and each low refractive index layer of the lower filter cavities has a thickness equal to 0.5 times one fourth of a central wavelength associated therewith; and
    a plurality of contiguous upper filter cavities formed on the lower filter cavities, each of the upper filter cavities consisting of two low refractive index layers and one high refractive index layer sandwiched between the low refractive index layers, wherein the plurality of upper filter cavities comprises:
        a first filter cavity having a high refractive index layer thereof having a thickness equal to 1.666 times one fourth of a central wavelength associated therewith, and low refractive index layers thereof each having a thickness equal to 1.666 times one eighth of a central wavelength associated therewith;
        a plurality of second filter cavities each having a high refractive index layer thereof having a thickness equal to 1.4 times one fourth of a central wavelength associated therewith, and low refractive index layers thereof each having a thickness equal to 1.4 times one eighth of a central wavelength associated therewith;
        a third filter cavity having a high refractive index layer thereof having a thickness equal to 1.6 times one fourth of a central wavelength associated therewith, and low refractive index layers thereof each having a thickness equal to 1.6 times one eighth of a central wavelength associated therewith; and
        a plurality of fourth filter cavities each having a high refractive index layer thereof having a thickness equal to 1.8 times one fourth of a central wavelength associated therewith, and low refractive index layers thereof each having a thickness equal to 1.8 times one eighth of a central wavelength associated therewith.

2. The optical filter as claimed in claim 1, wherein the material of the high refractive index layers are selected from one of tantalum pentoxide ($Ta_2O_5$) and titanium dioxide ($TiO_2$).

3. The optical filter as claimed in claim 1, wherein the material of the low refractive index layers are selected from one of silicon dioxide ($SiO_2$) and alumina ($Al_2O_3$).

4. The optical filter as claimed in claim 1, wherein the material of the high refractive index layers are selected from one of nano tantalum pentoxide ($Ta_2O_5$) and nano titanium dioxide ($TiO_2$).

5. The optical filter as claimed in claim 1, wherein the material of the low refractive index layers are selected from one of nano silicon dioxide ($SiO_2$) and nano alumina ($Al_2O_3$).

* * * * *